(12) United States Patent
Wakamatsu et al.

(10) Patent No.: US 8,571,770 B2
(45) Date of Patent: Oct. 29, 2013

(54) AUTOMATIC TRANSMISSION CONTROL SYSTEM AND CONTROL METHOD

(75) Inventors: Taihei Wakamatsu, Toyota (JP); Shojiro Suga, Nisshin (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 1330 days.

(21) Appl. No.: 12/042,514

(22) Filed: Mar. 5, 2008

(65) Prior Publication Data

US 2008/0221760 A1 Sep. 11, 2008

(30) Foreign Application Priority Data

Mar. 6, 2007 (JP) ................................. 2007-055395

(51) Int. Cl.
*G06F 7/00* (2006.01)
*G06F 17/00* (2006.01)
*G06F 19/00* (2011.01)

(52) U.S. Cl.
USPC .............................................. 701/52; 701/51

(58) Field of Classification Search
USPC ................................................ 701/51, 52, 95
See application file for complete search history.

(56) References Cited

U.S. PATENT DOCUMENTS

| | | | |
|---|---|---|---|
| 6,363,805 B1 | 4/2002 | Marchart | |
| 2003/0060329 A1* | 3/2003 | Sato et al. | 477/121 |
| 2004/0182187 A1* | 9/2004 | Katakura | 74/335 |
| 2004/0225430 A1* | 11/2004 | Bothe et al. | 701/52 |

FOREIGN PATENT DOCUMENTS

| | | |
|---|---|---|
| DE | 43 11 886 C2 | 10/1994 |
| DE | 197 55 096 A1 | 6/1999 |
| DE | 199 12 963 B4 | 9/2000 |
| JP | 01-105046 A | 4/1989 |
| JP | 04-290665 A | 10/1992 |
| JP | 05-322011 A | 12/1993 |
| JP | 9-264408 A | 10/1997 |
| JP | 9-317866 A | 12/1997 |
| JP | 11-257485 A | 9/1999 |
| JP | 2000-039062 A | 2/2000 |
| JP | 2000-055187 A | 2/2000 |
| JP | 2000-274521 A | 10/2000 |
| JP | 2000-283281 A | 10/2000 |
| JP | 2001-271919 A | 10/2001 |
| JP | 2006-046552 A | 2/2006 |
| JP | 2006-194399 A | 7/2006 |

* cited by examiner

*Primary Examiner* — Thomas Tarcza
*Assistant Examiner* — Imran Mustafa
(74) *Attorney, Agent, or Firm* — Sughrue Mion, PLLC

(57) ABSTRACT

Automatic transmission control system and control method have the functions or steps of: controlling shifting of an automatic transmission installed on a vehicle, in one of an automatic shift mode in which shifting of the automatic transmission is carried out based on a shift diagram, and a manual shift mode in which shifting of the automatic transmission is manually carried out; detecting at least one shift command of an upshift command for shifting up the automatic transmission and a downshift command for shifting down the automatic transmission, the shift command being manually entered; measuring a shift command time for which the shift command is detected; and switching from the automatic shift mode to a shift inhibition mode in which shifting of the automatic transmission is inhibited, without switching to the manual shift mode, based on the measured shift command.

6 Claims, 10 Drawing Sheets

AUTOMATIC TRANSMISSION CONTROL SYSTEM AND CONTROL METHOD

INCORPORATION BY REFERENCE

The disclosure of Japanese Patent Application No. 2007-055395 filed on Mar. 6, 2007, including the specification, drawings and abstract, is incorporated herein by reference in its entirety.

BACKGROUND OF THE INVENTION

1. Field of the Invention

This invention relates to automatic transmission control system and control method, and in particular to an automatic transmission control system capable of performing shift control in an automatic shift mode and a manual shift mode and such an automatic transmission control method.

2. Description of the Related Art

A known automatic transmission control system has an automatic shift mode in which shifting of the automatic transmission is controlled based on a shift diagram, and a manual shift mode in which shifting of the automatic transmission is controlled in accordance with upshifting and downshifting operations performed by the driver. If the driver performs an upshifting or downshifting operation during running of the vehicle in the automatic shift mode, the control system switches from the automatic shift mode to the manual shift mode, and the automatic transmission is shifted up or down in accordance with the driver's operation. An example of the control system as described above is disclosed in Japanese Patent Application Publication No. 11-257485 (JP-A-11-257485).

In the known automatic transmission control system as disclosed in JP-A-11-257485, an upshift switch and a downshift switch are mounted on a steering wheel so as to enable the driver to perform upshifting and downshifting operations, and the driver can press down the upshift switch and downshift switch on the steering wheel. If the driver presses down the downshift switch so as to apply an engine brake, the control system switches from the automatic shift mode to the manual shift mode, and effects downshift of the automatic transmission in response to the driver's operation.

In the known automatic transmission control system, when a specified time elapses after the downshift switch is pressed down, the system is arranged to switch from the manual shift mode to the automatic shift mode in which shifting is controlled based on the shift diagram. Thus, shift control of the automatic transmission based on the shift diagram, which is not intended by the driver, may be undesirably carried out upon the lapse of the specified time from the time that the downshift switch is pressed down. For example, even in the case where the automatic transmission is shifted down according to the driver's operation on the downshift switch, and the driver wishes to keep the transmission in the downshifted condition, the system switches from the manual shift mode to the automatic shift mode when the specified time elapses after the driver presses down the downshift switch, and the transmission may be switched back to the original gear position even though the driver caused the transmission to be shifted down. More specifically, even if the driver operates the downshift switch before the vehicle enters a curve so as to reduce the speed of the vehicle, the control system switches back to the automatic shift mode after a lapse of a given time, and effects upshift of the transmission based on the shift diagram while the vehicle is turning along the curve, which may result in a spin of the vehicle.

Also, in the known automatic transmission control system, switching from the automatic shift mode to the manual shift mode takes place when the driver presses down the downshift switch or upshift switch. Therefore, in the case where the driver wishes to simply switch the system from the automatic shift mode to the manual shift mode, the driver is required to press down the downshift switch or upshift switch, resulting in downshift or upshift of the transmission which is not desired nor intended by the driver.

Thus, in some cases, the known automatic transmission control system performs shift control of the automatic transmission in a manner that is not intended by the driver, which may result in deterioration of driveability.

SUMMARY OF THE INVENTION

The present invention has been developed in view of the above-described problems, and provides automatic transmission control system and control method that prevent shift control of the automatic transmission which is not intended by the driver, thus assuring improved driveability.

According to one aspect of the invention, an automatic transmission control system is provided which includes: a shift control device that controls shifting of an automatic transmission installed on a vehicle, in one of an automatic shift mode in which shifting of the automatic transmission is carried out based on a shift diagram, and a manual shift mode in which shifting of the automatic transmission is manually carried out, a shift command detecting device that detects at least one shift command of an upshift command for shifting up the automatic transmission and a downshift command for shifting down the automatic transmission, the shift command being manually entered, and a command time measuring device that measures a shift command time for which the shift command is detected by the shift command detecting device. In this system, when the shift control device controls shifting of the automatic transmission in the automatic shift mode, the shift control device switches from the automatic shift mode to a shift inhibition mode in which shifting of the automatic transmission is inhibited, without switching to the manual shift mode, based on the shift command time measured by the command time measuring device.

According to another aspect of the invention, an automatic transmission control method is provided which includes the steps of: controlling shifting of an automatic transmission installed on a vehicle, in one of an automatic shift mode in which shifting of the automatic transmission is carried out based on a shift diagram, and a manual shift mode in which shifting of the automatic transmission is manually carried out, detecting at least one shift command of an upshift command for shifting up the automatic transmission and a downshift command for shifting down the automatic transmission, the shift command being manually entered, measuring a shift command time for which the shift command is detected, and, when controlling shifting of the automatic transmission in the automatic shift mode, switching from the automatic shift mode to a shift inhibition mode in which shifting of the automatic transmission is inhibited, without switching to the manual shift mode, based on the measured shift command time.

According to the automatic transmission control system and control method as described above, even when a shift command is entered while shift control is performed in the automatic shift mode, the system can switch from the automatic shift mode to the shift inhibition mode in which shifting of the automatic transmission is inhibited, without switching to the manual shift mode, when the shift command time measured by the command time measuring device is long, for example. Thus, the control system and method are able to prevent shift control of the automatic transmission which is not intended by the driver, thus assuring improved driveability.

BRIEF DESCRIPTION OF THE DRAWINGS

The foregoing and further features and advantages of the invention will be better understood by reading the following detailed description of preferred embodiments of the invention, when considered in connection with the accompanying drawings, in which.

DETAILED DESCRIPTION OF THE PREFERRED EMBODIMENTS

In the following description and the accompanying drawings, the present invention will be described in greater detail with reference to the exemplary embodiments.

Figure 1:
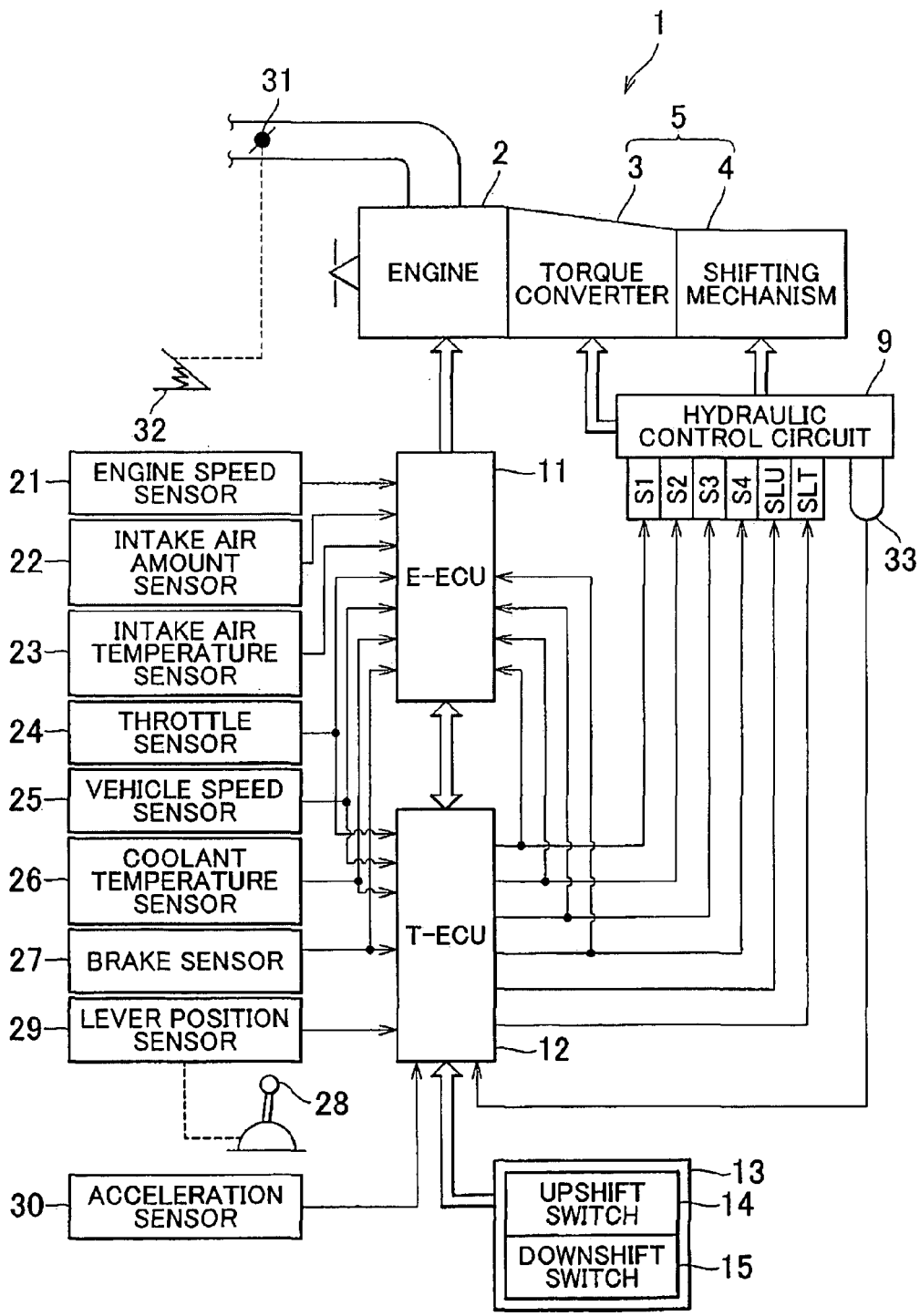
FIG. 1 is a schematic view generally showing the construction of a vehicle on which an automatic transmission control system according to a first embodiment of the invention is installed.
Figure 2:
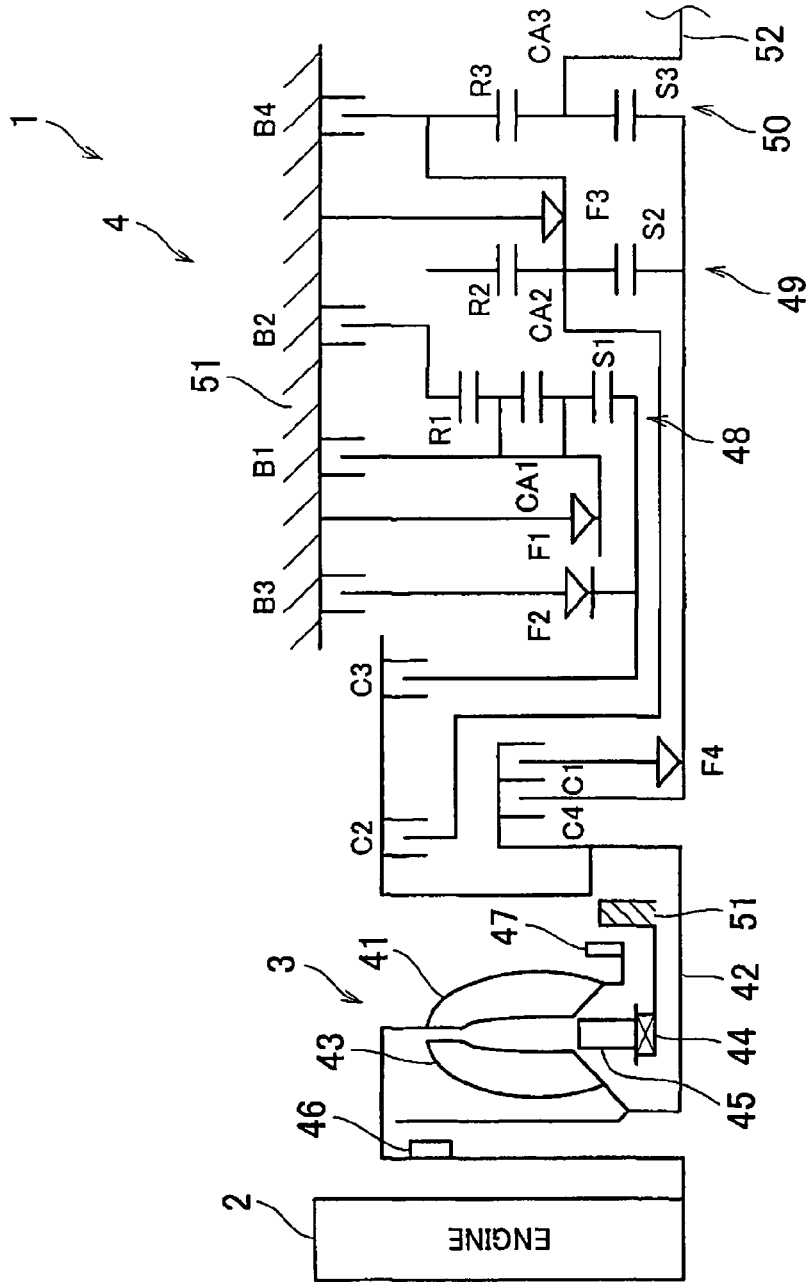
FIG. 2 is a skeleton diagram showing the construction of an automatic transmission to which the control system according to the first embodiment of the invention is applied.
Figure 3A:
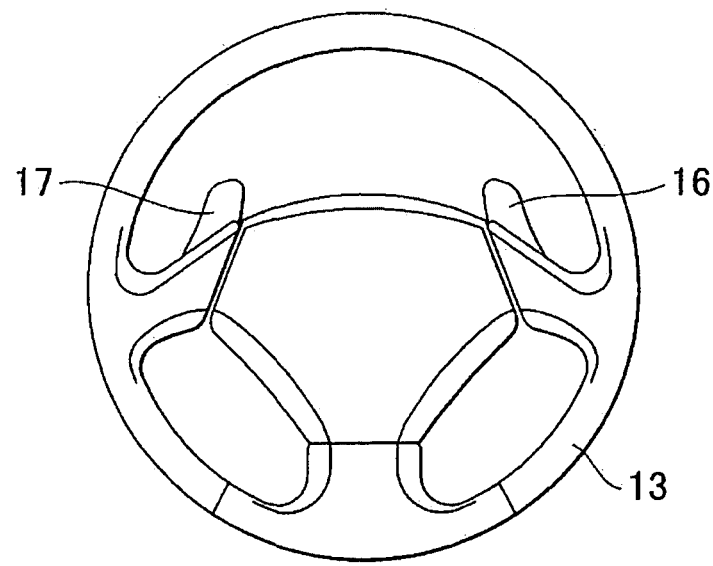
FIG. 3A and FIG. 3B are schematic views each showing one example of steering wheel of the vehicle on which the automatic transmission control system according to the first embodiment of the invention is installed.
Figure 3B:
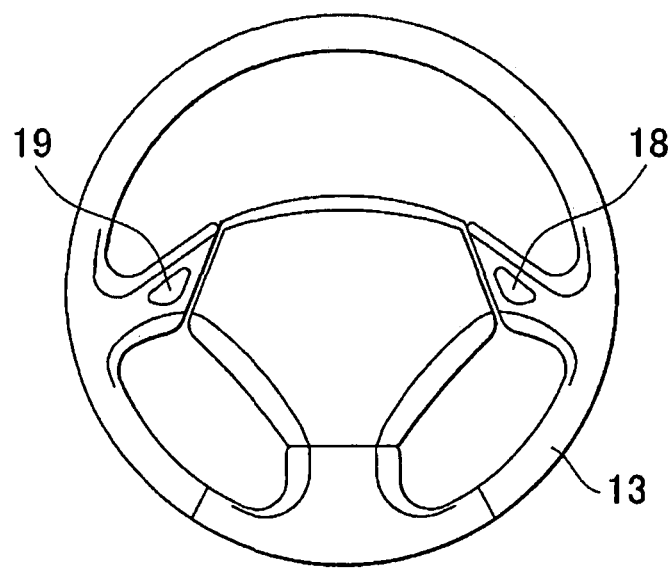
Figure 4:
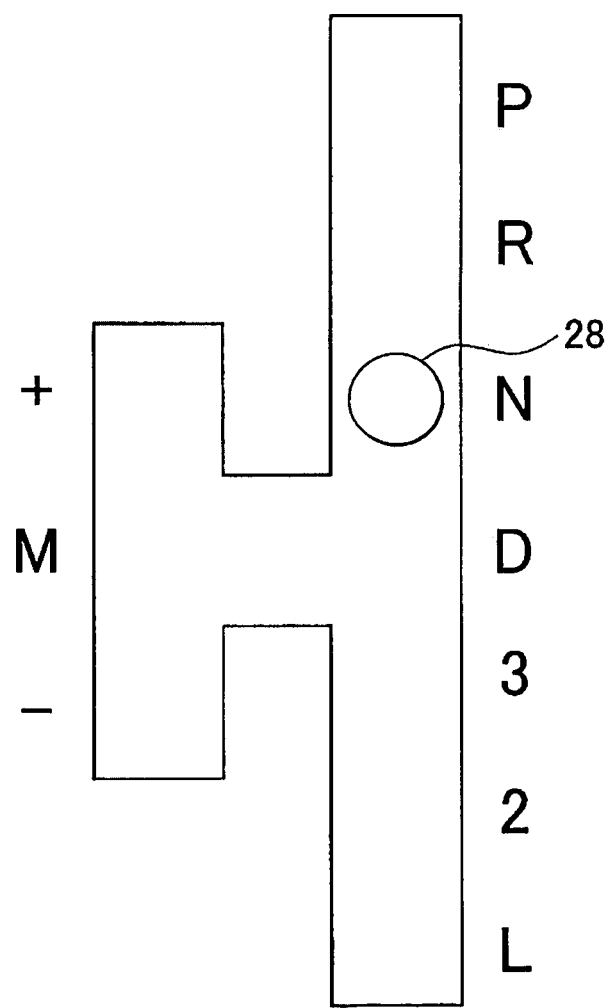
FIG. 4 is a schematic view showing one example of relationship between the positions of a shift lever of the vehicle on which the automatic transmission control system according to the first embodiment of the invention is installed, and gear ranges of the automatic transmission.

Initially, a first embodiment of the invention will be described in detail. FIG. 1 is a schematic view generally showing the construction of a vehicle on which an automatic transmission control system according to the first embodiment of the invention is installed. FIG. 2 is a skeleton diagram showing the construction of an automatic transmission to which the control system according to the first embodiment of the invention is applied. FIGS. 3A and 3B are schematic views each showing one example of steering wheel of the vehicle on which the automatic transmission control system according to the first embodiment of the invention is installed. FIG. 4 is a schematic view showing one example of relationship between the positions of a shift lever of the vehicle on which the automatic transmission control system according to the first embodiment of the invention is installed, and gear ranges of the automatic transmission.

As shown in FIG. 1, the vehicle 1 includes an engine 2 as an internal combustion engine, a torque converter 3 that increases torque produced by the engine 2, and a shifting mechanism 4 that changes the rotational speed of the output shaft of the torque converter 3. The torque generated from the shifting mechanism 4 is transmitted to driving wheels via a differential gear unit (not shown).

The engine 2 is constructed of a known power device that produces power by burning a fuel, such as gasoline or light oil. The torque converter 3 and the shifting mechanism 4 constitute an automatic transmission 5.

As shown in FIG. 1 and FIG. 2, the torque converter 3 is disposed between the engine 2 and the shifting mechanism 4, and includes a pump impeller 41 coupled to the engine 2, a turbine wheel 43 coupled to an input shaft 42 of the shifting mechanism 4, and a stator 45 whose rotation in one direction is inhibited by a one-way clutch 44. The pump impeller 41 and the turbine wheel 43 cooperate with each other to transmit power from the engine 2 to the shifting mechanism 4 via a fluid.

The torque converter 3 further includes a lock-up clutch 46 adapted to directly couple the pump impeller 41 and the turbine wheel 43 to each other. When the vehicle 1 runs at a high speed, the lock-up clutch 46 is operated by hydraulic oil to mechanically and directly couple the pump impeller 41 and the turbine wheel 43 to each other, thereby to increase the mechanical efficiency of power transmission from the engine 2 to the shifting mechanism 4. The torque converter 3 may operate under flex lock-up control in which the lock-up clutch 46 is caused to slip at a certain slip ratio.

The pump impeller 41 is provided with a mechanical oil pump 47 that produces a hydraulic pressure for use in shift control of the shifting mechanism 4, and a hydraulic pressure for supplying lubricating oil to various parts of the automatic transmission 5.

The shifting mechanism 4 includes a double-pinion type first planetary gear set 48, and single-pinion type second planetary gear set 49 and third planetary gear set 50. A sun gear S1 of the first planetary gear set 48 is selectively coupled to the input shaft 42 via a clutch C3, and is selectively coupled to a housing 51 via a one-way clutch F2 and a brake B3. The one-way clutch F2 and the brake B3 serve to inhibit the sun gear S1 from rotating in a direction (hereinafter referred to as "reverse direction") opposite to the direction of rotation of the input shaft 42.

A carrier CA1 of the first planetary gear set 48 is selectively coupled to the housing 51 via a brake B1. A one-way clutch F1 disposed in parallel with the brake B1 serves to inhibit the carrier CA1 from rotating in the reverse direction all the time.

A ring gear R1 of the first planetary gear set 48 is coupled to a ring gear R2 of the second planetary gear set 49, and is selectively coupled to the housing 51 via a brake B2. A sun gear S2 of the second planetary gear set 49 is coupled to a sun gear S3 of the third planetary gear set 50, and is selectively coupled to the input shaft 42 via a clutch C4. The sun gear S2 is also selectively coupled to the input shaft 42 via a one-way clutch F4 and a clutch C1, such that rotation of the sun gear S2 in the reverse direction can be inhibited.

A carrier CA2 of the second planetary gear set 49 is coupled to a ring gear R3 of the third planetary gear set 50, and is selectively coupled to the input shaft 42 via a clutch C2, while being selectively coupled to the housing 51 via a brake B4. A one-way clutch F3 disposed in parallel with the brake B4 inhibits the carrier CA2 from rotating in the reverse direction. A carrier CA3 of the third planetary gear set 50 is coupled to the output shaft 52.

The clutches C1-C4 and brakes B1-B4 (which will be simply referred to as "clutches C and brakes B" when not particularly distinguished from one another) are constructed of hydraulic friction devices, such as multiple-disc clutches and brakes, which are controlled (i.e., engaged and released) by hydraulic actuators. Each of the clutches C and brakes B is placed in one of the engaged and released states, according to a hydraulic circuit in which oil paths are selected based on energization and deenergization of transmission solenoids S1-S4 and linear solenoids SL1, SL2 of a hydraulic control circuit 9 (which will be described later), and an operating state of a manual valve (not shown). Thus, the shifting mechanism 4 is placed in a selected one of gear positions which matches the selected combination of the engaged and released states of the clutches C and brakes B. In this embodiment, the shifting mechanism 4 is placed in any one of six forward gear positions from the $1^{st}$-speed gear position to the $6^{th}$-speed gear position, and one reverse gear position.

The vehicle 1 further includes the above-mentioned hydraulic control circuit 9 for hydraulically controlling the ratio at which torque is increased by the torque converter 3 and the gear position of the shifting mechanism 4. The hydraulic control circuit 9 has the above-mentioned transmission solenoids S1-S4, linear solenoids SLT, SLU, and an oil temperature sensor 33 for measuring the oil temperature of hydraulic oil.

The transmission solenoid S1 is energized or actuated upon shifting from the 1st speed to the 2nd speed. The transmission solenoid S2 is energized upon shifting from the 2nd speed to the 3rd speed and shifting from the 5th speed to 6th speed. The transmission solenoid S3 is energized upon shifting from the 3rd speed to the 4th speed. The transmission solenoid S4 is energized upon shifting from the 4th speed to the 5th speed.

The linear solenoid SLT is adapted to perform line pressure control and back pressure control of an accumulator (not shown). The linear solenoid SLU is adapted to perform control on a lock-up mechanism.

In operation, friction elements of the shifting mechanism 4 are selectively engaged or released by hydraulic pressure developed from the line pressure as the original pressure, in accordance with the operating states (energized states) of the transmission solenoids S1-S4 and the linear solenoids SLT, SLU. The ratio of the rotational speed of the input shaft 42 of the shifting mechanism 4 to that of the output shaft 52 is changed depending on the combination of the engaged and released states of the friction elements, to thus provide the gear ratio or speed ratio of the shifting mechanism 4.

The vehicle 1 further includes an engine speed sensor 21 that measures the rotational speed of the engine 2, an intake air amount sensor or air flow meter 22 that measures the intake air amount of the engine 22, an intake air temperature sensor 23 that measures the temperature of air drawn into the engine 2, a throttle sensor 24 that measures the degree of opening of a throttle valve 31, a vehicle speed sensor 25 that measures the vehicle speed based on the rotational speed of the output shaft 52 of the shifting mechanism 4, a coolant temperature sensor 26 that measures the coolant temperature of the engine 2, and a brake sensor 27 that measures the pedal effort or pressure applied to the brake pedal.

The brake sensor 27 is adapted to measure a change of the master cylinder pressure or an operation stroke, which corresponds to a pedal effort or pressure applied to the brake pedal by the driver. The brake sensor 27 generates an electric signal indicative of the measured pedal effort, as a brake pedal effort signal, to a T-ECU 12 (which will be described later).

The vehicle 1 further includes a shift lever 28, a lever position sensor 29 that detects the position of the shift lever 28, and an acceleration sensor 30 that measures the lateral acceleration of the vehicle 1.

The vehicle 1 further includes an E-ECU (Engine Electronic Control Unit) 11 for controlling the engine 2, and a T-ECU (Transmission Electronic Control Unit) 12 for controlling the automatic transmission 5.

The E-ECU 11 has CPU (Central Processing Unit), RAM (Random Access Memory), ROM (Read Only Memory) and input and output interfaces, which are not shown in FIG. 1, and is arranged to generate an engine control signal to the engine 2 so as to control the engine 2 in accordance with the amount of operation of an accelerator pedal 32.

The E-ECU 11 is connected with the engine speed sensor 21, intake air amount sensor 22, intake air temperature sensor 23, throttle sensor 24, vehicle speed sensor 25, coolant temperature sensor 26 and the brake sensor 27, and receives signals indicative of the engine speed, intake air amount, intake air temperature, throttle opening, vehicle speed, coolant temperature and the brake pedal effort, from these sensors.

The T-ECU 12 has CPU, RAM, ROM and input and output interfaces, which are not shown in FIG. 1. The ROM stores a map representing a shift diagram that is plotted based on the vehicle speed and the throttle opening, and a program or programs according to which shift control is performed.

The T-ECU 12 is operable to control the automatic transmission 5 in one of an automatic shift mode in which shift control is automatically carried out based on the shift diagram, a manual shift mode in which shift control is carried out based on a shift command manually entered by the driver, and a shift inhibition mode in which automatic shifting and manual shifting are both inhibited.

The T-ECU 12 may be considered as a device having the control function, shift control function, shift command detecting function, command time measuring function, turning determining function and other functions associated with the invention, as described later.

The T-ECU 12 is connected with the throttle sensor 24, vehicle speed sensor 25, coolant temperature sensor 26, brake sensor 27, lever position sensor 29, acceleration sensor 30 and the oil temperature sensor 33, and receives signals indicative of the throttle opening, vehicle speed, coolant temperature, brake pedal effort, the position of the shift lever 28, the lateral acceleration of the vehicle 1 and the hydraulic oil temperature, from these sensors, respectively.

The vehicle 1 further includes an upshift switch (hereinafter simply referred to as "shift SW "+"") 14 that is manually operated to produce a shift command for shifting up the automatic transmission 5, and a downshift switch (hereinafter simply referred to as "shift SW "−"") 15 that is manually operated to produce a shift command for shifting down the automatic transmission 5. The upshift switch 14 and downshift switch 15 are provided on the steering wheel 13, such that the driver can operate these switches 14, 15 without releasing his/her hand(s) from the steering wheel.

Each of the shift SW "+" 14 and shift SW "−" 15 is in the form of a momentary switch, which is arranged to keep generating a shift command while the driver presses and holds the shift SW or pulls and holds the shift SW.

The shift SW "+" 14 and shift SW "−" 15 are respectively formed by, for example, an upshift paddle 16 and a downshift paddle 17, as shown in FIG. 3A. The upshift paddle 16 or downshift paddle 17 generates a shift command when the driver pulls the paddle toward himself/herself. The T-ECU 12 is adapted to detect a shift command from the upshift paddle 16 and downshift paddle 17. Thus, the T-ECU 12 has the function of detecting a shift command.

The shift SW "+" 14 and shift SW "−" 15 may also be respectively formed by an upshift button 18 and a downshift button 19, as shown in FIG. 3B. While the upshift button 18 and downshift button 19 are mounted on the right spoke and left spoke of the steering wheel 13 in the example of FIG. 3B, the positions of these buttons are not limited to those of this example. For example, a pair of upshift button 18 and downshift button 19 may be mounted on one of the right and left spokes or on both of the spokes. Also, one of the upshift button 18 and downshift button 19 may be mounted on the front face of the steering wheel 13, and the other button may be mounted on the back face of the steering wheel 13.

A first example of the shift lever 28 is shown in FIG. 4. In this example, the shift lever 28 may be placed in a selected one of the L position corresponding to the "Low" range, $2^{nd}$ and $3^{rd}$ positions corresponding to the $2^{nd}$ and $3^{rd}$ ranges, D position corresponding to the "Drive" range, N position corresponding to the "Neutral" range, R position corresponding to the "Reverse" range, and the P position corresponding to the "Parking" range.

The shift lever 28 may also be operated to the M position representing a manual position for allowing the automatic transmission 5 to be manually shifted up or down in the manual shift mode, a plus position (+ position) for generating an upshift command, and a minus position (− position) for generating a downshift command. The M position is located at one side of the D position. When the shift lever 28 is moved to the side from the D position, the lever 28 is held in the M position by a spring (not shown).

The shift SW "+" 14 and shift SW "−" 15 are able to transmit valid signals to the T-ECU 12 only when the shift lever 28 is placed in the M position.

While the shift lever 28 can take the M position in the first example as described above, the positions the shift lever 28 can take are not limited to those of this example. As a second example, the shift lever 28 may take one of the L position, $2^{nd}$ and $3^{rd}$ positions, D position, N position, R position and the P position.

In this case, the operations using the shift SW "+" 14 and shift SW "−" 15 are valid only when the shift lever 28 is placed in the D position. For example, if the shift SW "+" 14 or shift SW "−" 15 is operated by the driver when the shift lever 28 is placed in the D position, the T-ECU 12 switches from the automatic shift mode to the manual shift mode.

In the manual shift mode, if the gear position of the automatic transmission 5 designated by the driver and the gear position determined according to the shift diagram coincide with each other over a given period of time, or the shift SW "+" 14 and shift SW "−" 15 are not operated for a given period of time, the T-ECU 12 terminates the manual shift mode, and switches to the automatic shift mode.

In the case of the automatic shift mode in both of the first and second examples as described above, the T-ECU 12 shifts up or down the automatic transmission 5 through the use of the hydraulic control circuit 9, based on the range corresponding to the selected position of the shift lever 28, vehicle speed, throttle opening and the map representing the shift diagram. For example, when the shift lever 28 is placed in the D range, the gear position of the automatic transmission 5 may be switched among the $1^{st}$-speed gear position through the $6^{th}$-speed gear position.

If the N range representing the neutral range is designated by the driver, namely, if the driver operates the shift lever 28 to the N position, the T-ECU 12 causes the hydraulic control circuit 9 to release the clutches C and/or brakes B, so that no torque is transmitted from the input shaft to the output shaft of the automatic transmission 5.

If the P range representing the parking range is designated by the driver, namely, if the driver operates the shift lever 28 to the P position, the T-ECU 12 controls the automatic transmission 5 via the hydraulic control circuit 9 so that no torque is transmitted from the input shaft to the output shaft of the automatic transmission 5, and engages a parking pole (not shown) with a parking gear disposed on the output shaft of the automatic transmission 5 so as to fix the output shaft of the automatic transmission 5.

In the following, the features of the T-ECU that provides the automatic transmission control system according to the first embodiment of the invention will be described.

The T-ECU 12 that serves as the control system for the automatic transmission 5 has a timer (not shown). When the T-ECU 12 starts detecting a shift command generated from one of the shift SW "+" 14 and shift SW "−" 15 in the automatic shift mode, the T-ECU 12 measures the shift command time representing the length of time that the shift command is kept detected, by means of the timer, thereby to measure the length of time that the shift SW "+" 14 or shift SW "−" 15 is pushed by the driver.

Thus, the T-ECU 12 has the function of measuring the shift command time for which the shift command is detected.

The T-ECU 12 determines whether the measured shift command time is within a specified length of time, i.e., is equal to or shorter than the specified time. A threshold value representing the specified time is stored in advance in the ROM. If the measured shift command time is equal to or shorter than the threshold value, the T-ECU 12 switches from the automatic shift mode to the manual shift mode, and effects shifting of the automatic transmission 5 (i.e., changes the gear position of the automatic transmission 5) according to the shift command. If the shift command time exceeds the threshold value stored in the ROM, on the other hand, the T-ECU 12 determines that the shift SW is pushed long, and switches from the automatic shift mode to the shift inhibition mode in which automatic shifting of the transmission is inhibited. Thus, the T-ECU 12 has the shift control function of switching from the automatic shift mode to the shift inhibition mode for inhibiting shifting of the automatic transmission. The specified time used in this embodiment may be considered as the specified time as mentioned above with regard to the present invention.

Here, the threshold value representing the specified time of the invention may be changed depending on the running conditions, such as the vehicle speed and the acceleration, of the vehicle 1.

For example, the threshold value stored in the ROM of the T-ECU 12 may be determined such that the specified time is shorter as the vehicle speed is higher. In this case, the T-ECU 12 obtains a signal indicative of the vehicle speed from the vehicle speed sensor 25 upon a start of detection of a shift command, and determines whether the shift command time is within the specified time, based on the threshold value corresponding to the vehicle speed.

When the automatic shift mode is switched to the shift inhibition mode, the T-ECU 12 makes upshift or downshift based on the shift command entered with the shift SW "+" 14 or shift SW "−" 15 invalid until it returns to the automatic shift mode.

Figure 5:
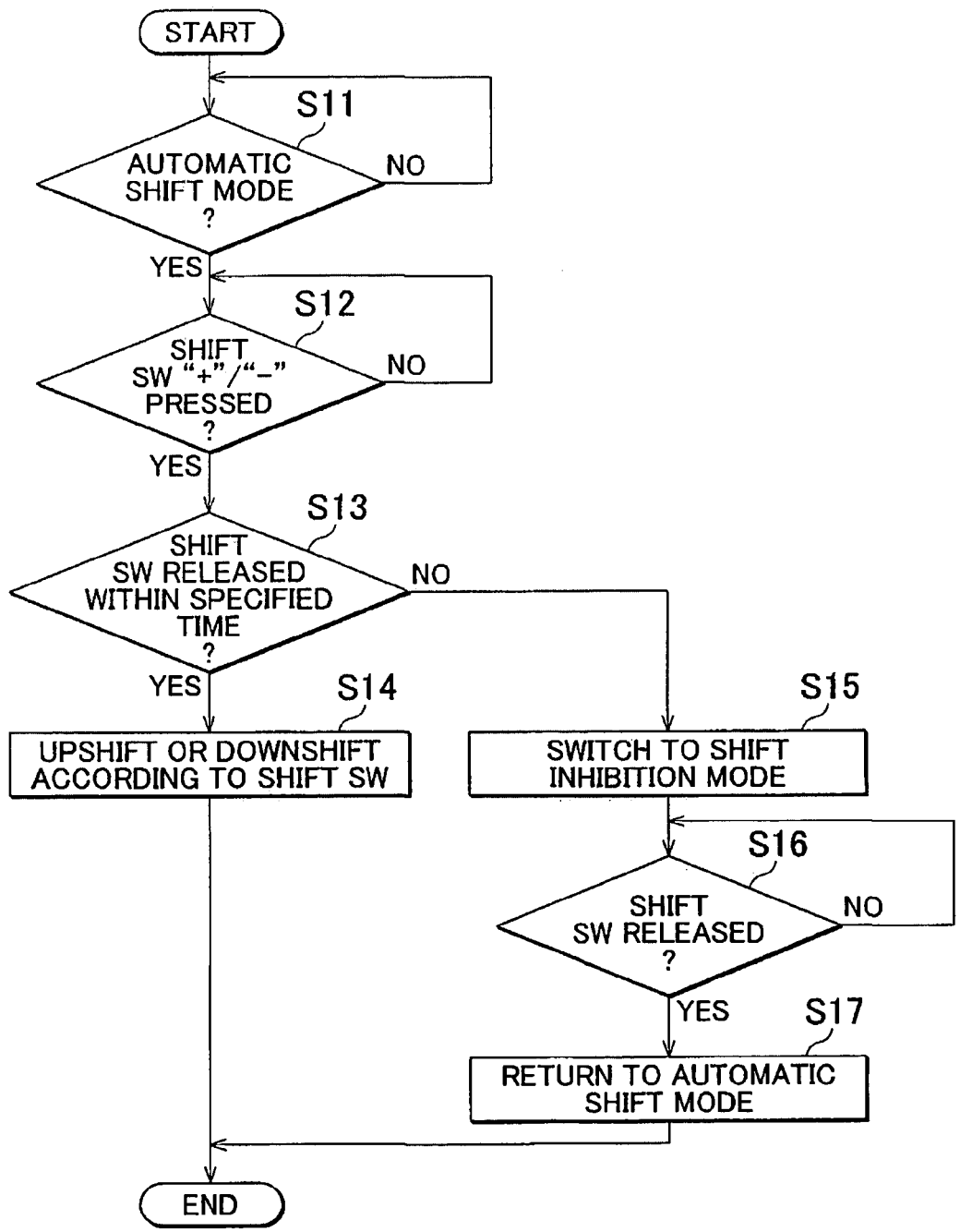
FIG. 5 is a flowchart useful for explaining the operation of the automatic transmission control system according to the first embodiment of the invention.

FIG. 5 is a flowchart useful for explaining the operation of the automatic transmission control system according to the first embodiment of the invention. The CPU of the T-ECU 12 executes the following control process at predetermined time intervals, according to a program that can be implemented by the CPU.

Initially, the T-ECU 12 determines in step S11 whether it is in the automatic shift mode.

If the T-ECU 12 determines that it is in the automatic shift mode (i.e., if an affirmative decision (YES) is made in step S11), the control proceeds to step S12. If the T-ECU 12 determines that it is not in the automatic shift mode (i.e., if a negative decision (NO) is made in step S11), this step is repeatedly executed.

The T-ECU 12 then determines in step S12 whether the shift SW "+" 14 or the shift SW "−" 15 is pressed. When the T-ECU 12 receives a shift command, it determines that the shift SW "+" 14 or the shift SW "−" 15 is pressed (i.e., an affirmative decision (YES) is made in step S12), and starts measuring the length of time that the shift command is entered, by means of the timer. If it is determined that neither of the shift SW "+" 14 and the shift SW "−" 15 is pressed (i.e., if a negative decision (NO) is made in step S12), this step is repeatedly executed.

Then, the T-ECU 12 determines in step S13 whether the shift SW that has been pressed down is released within a specified time that is stored in advance in the ROM.

In step S13, the T-ECU 12 compares the shift command entry time measured by the timer, i.e., the length of time that the shift command is entered, with the specified time stored in the ROM, and determines that the shift SW "+" 14 or the shift SW "−" 15 is released when the shift command ceases to be entered from the shift SW within the specified time.

If the T-ECU 12 determines in step S13 that the shift SW "+" 14 or the shift SW "−" 15 is released within the specified time (i.e., if an affirmative decision (YES) is made in step S13), the T-ECU 12 switches from the automatic shift mode to the manual shift mode, and effects upshift or downshift of the automatic transmission 5 in step S14, according to the upshift command entered from the shift SW "+" 14 or the downshift command entered from the shift SW "−" 15. Then, the T-ECU 12 finishes the process of FIG. 5 in step S14.

If the T-ECU 12 determines that the shift SW is not released within the specified time (i.e., if a negative decision (NO) is made in step S13), the T-ECU 12 effects upshift or downshift of the automatic transmission 5 according to the upshift command entered from the shift SW "+" 14 or the downshift command entered from the shift SW "−" 15 and makes a switch to the shift inhibition mode in which the gear position of the automatic transmission 5 is not automatically changed (i.e., the automatic transmission 5 is not automatically shifted up or down).

After switching to the shift inhibition mode, the T-ECU 12 determines in step S16 whether the shift SW "+" 14 or the shift SW "−" 15 is released.

If the T-ECU 12 determines that the shift SW has not been released (i.e., if a negative decision (NO) is made in step S16), this step is repeatedly executed.

If the T-ECU 12 determines that the shift SW has been released (i.e., if an affirmative decision (YES) is made in step S16), the T-ECU 12 returns from the shift inhibition mode to the automatic shift mode in step S17, and finishes the process of FIG. 5.

In the automatic transmission control system according to the first embodiment of the invention, the gear position of the automatic transmission is inhibited from being automatically changed while a shift command is being entered, as described above. Thus, the control system can prevent shift control of the automatic transmission against the intention of the driver. Also, it can be determined based on the entry time of the shift command whether the driver intends to manually shift the automatic transmission up or down, or the driver intends to inhibit the automatic transmission from being automatically shifted up or down. Thus, the control system can control the automatic transmission in a manner that reflects the intention of the driver. Also, since the inhibition of shifting can be cancelled when entry of the shift command is finished, the driver is able to continue or cancel the inhibition of automatic shifting of the automatic transmission, by continuing or finishing entry of the shift command.

While the above-described embodiment is concerned with the case where the control system makes a switch to the shift inhibition mode when one of the shift SWs is pressed for a length of time that exceeds the specified time, the invention is not limited to this case. For example, the condition under which the switch to the shift inhibition mode is started may be changed such that the control system switches to the shift inhibition mode when both of the shift SWs are pressed within a specified period of time, as in the second embodiment as described below.

Next, an automatic transmission control system according to the second embodiment of the invention will be described with reference to FIG. 1 and FIG. 6.

The automatic transmission control system according to the second embodiment is similar in construction to the automatic transmission control system according to the first embodiment of the invention. The same reference numerals as used in FIG. 1 illustrating the first embodiment will be used for identifying constituent elements of the control system of the second embodiment, and only the differences between these embodiments will be described in detail.

When the shift SW "+" 14 or the shift SW "−" 15 is operated, the T-ECU 12 measures the shift command time (i.e., the length of time that it receives a shift command) using the timer, thereby to measure the length of time that the shift SW "+" 14 or the shift SW "−" 15 is pressed by the driver.

While one of the shift SWs is being operated, the T-ECU 12 determines whether the other shift SW is operated within a specified time. Namely, it is determined whether, before the measured shift command time for one of upshift and downshift exceeds the specified time, the shift command detector (i.e., the T-ECU 12) detects a shift command for the other of upshift and downshift.

When it is determined that the other shift SW is operated within the specified time, the T-ECU 12 switches from the automatic shift mode to the shift inhibition mode.

Figure 6:
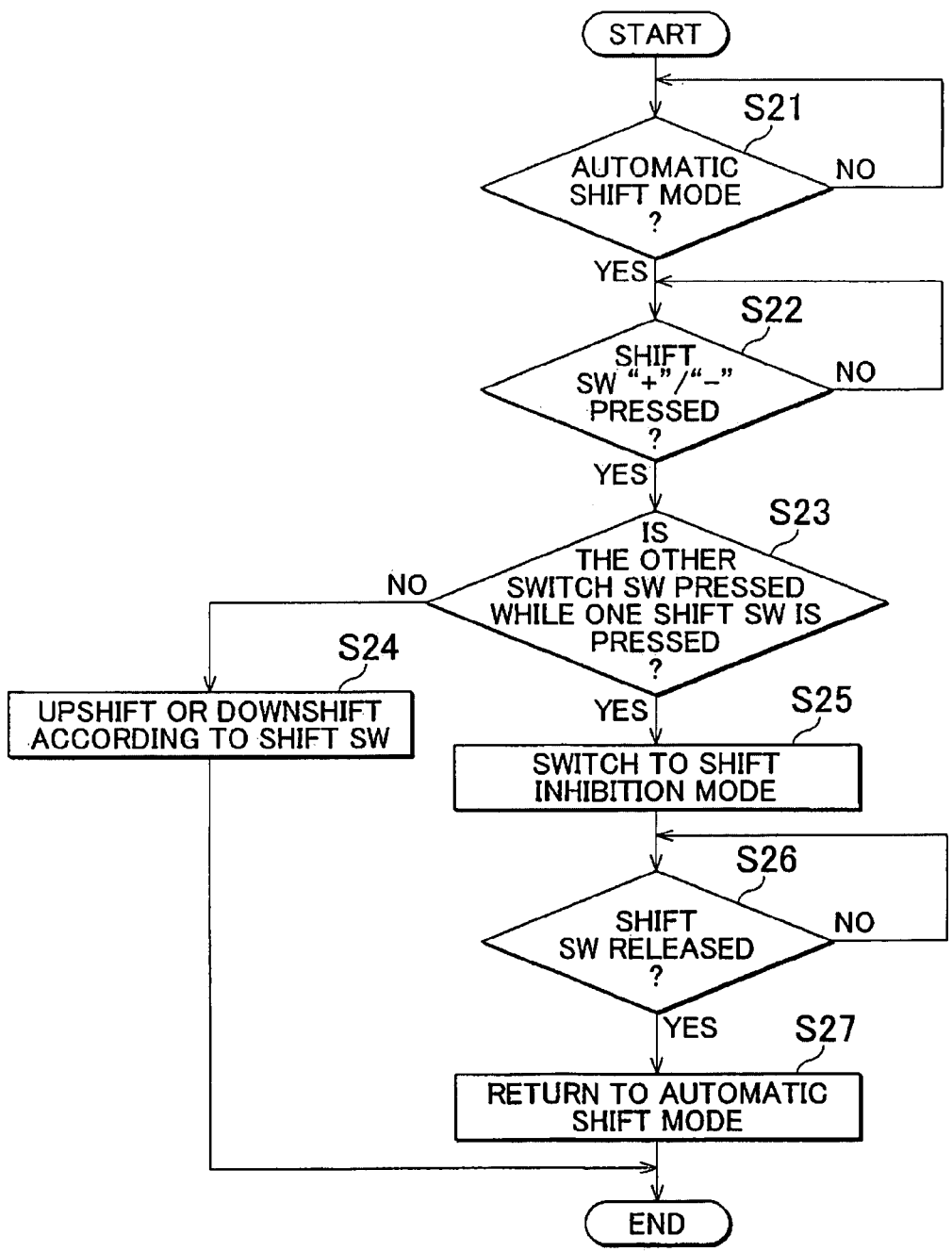
FIG. 6 is a flowchart useful for explaining the operation of an automatic transmission control system according to a second embodiment of the invention.

FIG. 6 is a flowchart useful for explaining the operation of the automatic transmission control system according to the second embodiment of the invention.

Initially, the T-ECU 12 determines in step S21 whether it is in the automatic shift mode.

If the T-ECU 12 determines that it is in the automatic shift mode (i.e., if an affirmative decision (YES) is made in step S21), the control proceeds to step S22. If the T-ECU 12 determines that it is not in the automatic shift mode (i.e., if a negative decision (NO) is made in step S21), on the other hand, this step is repeatedly executed.

Then, the T-ECU 12 determines in step S22 whether one of the shift SWs is pressed. If the T-ECU 12 receives a shift command, it determines that the shift SW "+" 14 or the shift SW "−" 15 is pressed (i.e., an affirmative decision (YES) is made in step S22), and starts measuring the length of time that the shift command is entered, using the timer.

If neither of the shift SWs is pressed (i.e., if a negative decision (NO) is made in step S22), on the other hand, this step is repeatedly executed.

Then, the T-ECU 12 determines in step S23 whether the other shift SW is pressed while the above-indicated one shift SW is held down, within the specified time stored in advance in the ROM.

In step S23, the T-ECU 12 compares the shift command entry time measured by the timer, with the specified time stored in the ROM, and determines that both of the shift SW "+" 14 and the shift SW "+" 15 are pressed within the specified time when a shift command that is different from the currently entered upshift command or downshift command is entered before the expiration of the specified time.

If the T-ECU 12 determines that both of the shift SW "+" 14 and the shift SW "−" 15 are not concurrently pressed within the specified time (i.e., if a negative decision (NO) is made in step S23), the T-ECU 12 switches from the automatic shift mode to the manual shift mode, and effects upshift or downshift of the automatic transmission 5 in step S24, according to the upshift command entered from the shift SW "+" 14 or the downshift command entered from the shift SW "−" 15. Then, the T-ECU 12 finishes the process of FIG. 6.

If the T-ECU 12 determines that both of the shift SW "+" 14 and the shift SW "−" 15 are concurrently pressed within the specified time (i.e., if an affirmative decision (YES) is made in step S23), on the other hand, the T-ECU 12 goes to step S25 to make a switch to the shift inhibition mode in which automatic shifting of the automatic transmission 5 is not performed.

After switching to the shift inhibition mode, the T-ECU 12 determines in step S26 whether the shift SW "+" 14 and the shift SW "−" 15 are released. In this case, the T-ECU 12 determines that the shift SWs are released when both of the shift SW "+" 14 and the shift SW "−" 15 are released. The manner of determination in step S26 is not limited to this, but release of the shift SW may be determined when one of the shift SW "+" 14 and the shift SW "−" 15 is released.

If the T-ECU 12 determines that the shift SW "+" 14 and the shift SW "−" 15 are not released (i.e., if a negative decision (NO) is made in step S26), this step is repeatedly executed.

If the T-ECU 12 determines that the shift SW "+" 14 and the shift SW "−" 15 are released (i.e., if an affirmative decision (YES) is made in step S26), the T-ECU 12 returns from the shift inhibition mode to the automatic shift mode in step S27, and finishes the process of FIG. 6.

As described above, the automatic transmission control system according to the second embodiment of the invention is able to inhibit automatic and manual shifting of the automatic transmission when concurrently detecting the shift commands for upshift and downshift of the transmission, thus assuring enhanced reliability of the driver's operation to inhibit automatic and manual shifting of the automatic transmission. Also, since the inhibition of shifting can be cancelled when the entry of the shift command is finished, the driver is able to continue or cancel the inhibition of automatic shifting of the automatic transmission, by continuing or finishing entry of the shift command.

While the embodiments as described above are concerned with the case where the control system returns to the automatic shift mode immediately after the shift SW is/are released, the invention is not limited to this case, but the condition under which the control system returns to the automatic shift mode may be changed such that it returns to the automatic shift mode after the shift inhibition mode is extended for a predetermined time after release of the shift SW, as in the third embodiment as described below.

Next, an automatic transmission control system according to the third embodiment of the invention will be described with reference to FIG. 1 and FIG. 7.

The automatic transmission control system according to the third embodiment is similar in construction to the automatic transmission control system according to the first embodiment of the invention. The same reference numerals as used in FIG. 1 illustrating the first embodiment will be used for identifying constituent elements of the control system of the third embodiment, and only the differences between these embodiments will be described in detail.

The T-ECU 12 is adapted to calculate a duration T for which the shift inhibition mode is extended after release of the shift SW "+" 14 or the shift SW "−" 15, based on the length of time that the shift SW "+" 14 or the shift SW "−" 15 is pressed. The duration T may be regarded as the predetermined extended time as mentioned above with regard to the present invention.

Here, the duration T is obtained by calculating the product of the length of time that the shift SW is pressed and a constant, or the product of the length of time that the shift SW is pressed and a time variable, or the sum of the length of time that the shift SW is pressed and a constant. These constants, time variable, etc., are stored in advance in the ROM.

When the driver releases the shift SW "+" 14 or the shift SW "−" 15 in the shift inhibition mode, and it is determined that the shift command ceases to be issued, the T-ECU 12 obtains the shift command time, referring to the timer.

The T-ECU 12 calculates the duration T for which the shift inhibition mode is extended, based on the constant or time variable stored in the ROM, and extends the shift inhibition mode, i.e., continues to operate in the shift inhibition mode, until the duration T expires.

If a shift command is entered again before the expiration of the duration T, the T-ECU 12 measures the shift command time (i.e., the length of time that the shift command is entered), and sets a new duration T based on the shift command time, so as to extend the shift inhibition mode again.

Figure 7:
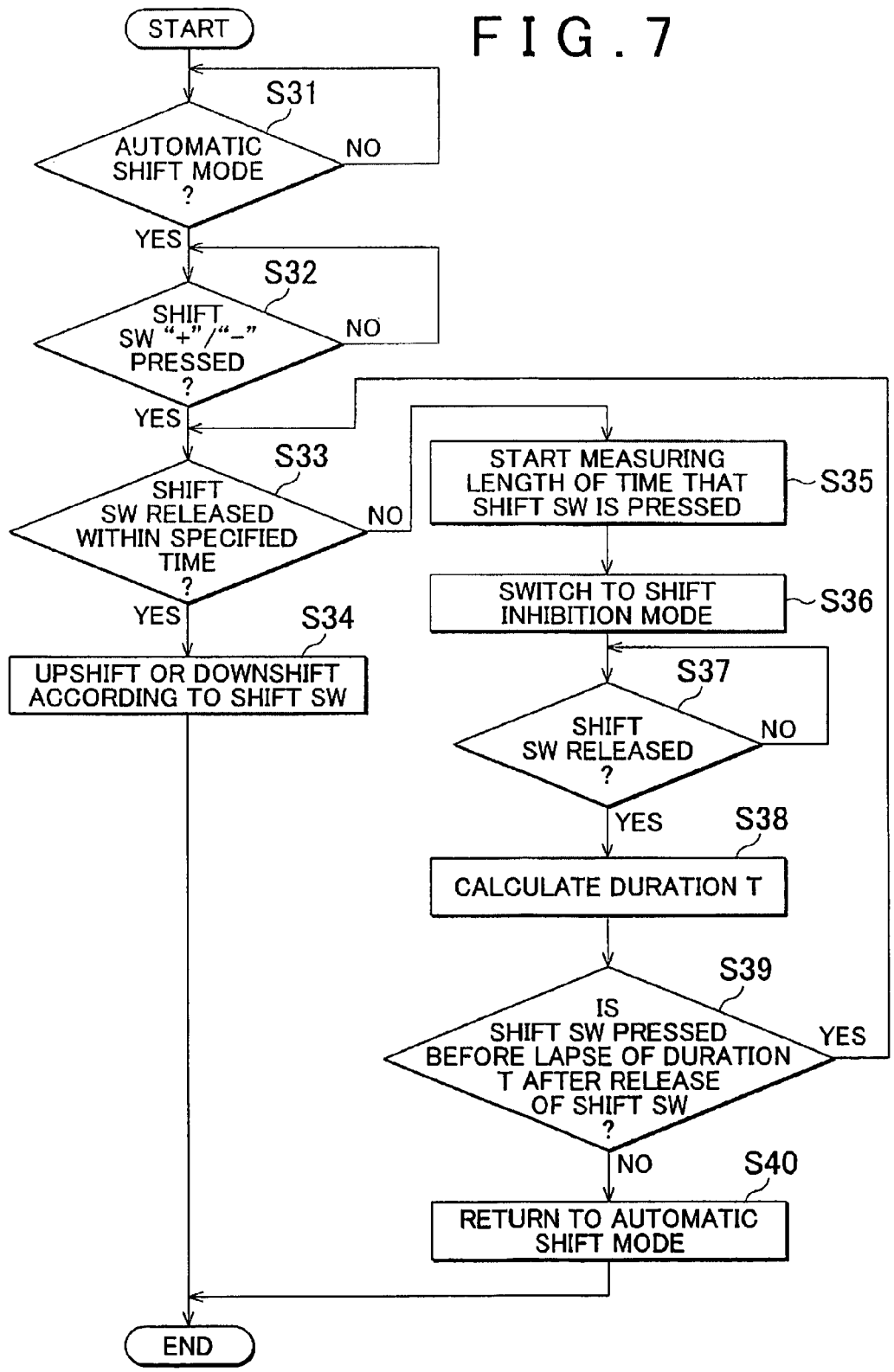
FIG. 7 is a flowchart useful for explaining the operation of an automatic transmission control system according to a third embodiment of the invention.

FIG. 7 is a flowchart useful for explaining the operation of the automatic transmission control system according to the third embodiment of the invention. The CPU of the T-ECU 12 executes the following control process at given time intervals, according to a program that can be implemented by the CPU.

Initially, the T-ECU 12 determines in step S31 whether it is in the automatic shift mode.

If the T-ECU 12 determines that it is in the automatic shift mode (i.e., if an affirmative decision (YES) is made in step S31), the control proceeds to step S32. If the T-ECU 12 determines that it is not in the automatic shift mode (i.e., if a negative decision (NO) is made in step S31), on the other hand, this step is repeatedly executed.

Then, the T-ECU 12 determines in step S32 whether one of the shift SWs is pressed. When the T-ECU 12 receives an upshift command or a downshift command, it determines that the shift SW "+" 14 or the shift SW "−" 15 is pressed (i.e., an affirmative decision (YES) is made in step S32), and starts measuring the length of time that the shift command is entered, using the timer. If it is determined that neither of the shift SWs is pressed (i.e., if a negative decision (NO) is made in step S32), on the other hand, this step is repeatedly executed.

Subsequently, the T-ECU 12 determines in step S33 whether the shift SW that has been pressed down is released within a specified time stored in advance in the ROM. This determination is made in a manner similar to that of the above-indicated step S13.

If the T-ECU 12 determines that the shift SW that has been pressed down is released within the specified time (i.e., if an affirmative decision (YES) is made in step S33), the T-ECU 12 switches from the automatic shift mode to the manual shift mode, and effects upshift or downshift of the automatic transmission 5 in step S34, based on the upshift command entered from the shift SW "+" 14 or the downshift command entered from the shift SW "−" 15. Then, the T-ECU 12 finishes the process of FIG. 7.

If the T-ECU 12 determines that the shift SW that has been pressed down is not released within the specified time (i.e., if a negative decision (NO) is made in step S33), on the other hand, the T-ECU 12 starts measuring, with the timer, a new length of time that the shift SW "+" 14 or the shift SW "−" 15 is pressed in step S35, and makes a switch to the shift inhibition mode for inhibiting shifting in step S36.

After switching to the shift inhibition mode, the T-ECU 12 determines in step S37 whether the shift SW that has been pressed down is released.

If the T-ECU 12 determines that the shift SW that has been pressed down is not released (i.e., if a negative decision (NO) is made in step S37), this step is repeatedly executed.

If the T-ECU 12 determines that the shift SW that has been pressed down is released (i.e., if an affirmative decision (YES) is made in step S37), the T-ECU obtains the measured time from the timer, resets the timer, and starts measuring an elapsed time after release of the shift SW "+" 14 or the shift SW "−" 15.

Then, the T-ECU 12 calculates the duration T in step S38, based on the obtained time and the constant or time variable stored in the ROM.

Then, the T-ECU 12 determines in step S39 whether either of the shift SWs is pressed again before the expiration of the duration T after release of the shift SW.

If the T-ECU 12 determines that one of the shift SWs is pressed again before the expiration of the duration T (i.e., if an affirmative decision (YES) is made in step S39), the control returns to step S33. At this time, the T-ECU 12 resets the timer, and starts measuring the length of time that shift SW is pressed.

If it is determined that neither of the shift SWs is pressed before the expiration of the duration T (i.e., if a negative decision (NO) is made in step S39), the T-ECU 12 returns from the shift inhibition mode to the automatic shift mode in step S40, and finishes the process of FIG. 7.

As described above, the automatic transmission control system according to the third embodiment of the invention is prevented from returning to the automatic shift mode for a certain period of time even if the shift command detecting device finishes detecting a shift command, i.e., the driver's operation to enter a shift command is finished. Therefore, the control system is prevented from performing shift control that is not intended by the driver, even in the case where the driver unavoidably releases his/her hand(s) from the steering wheel while operating the vehicle, resulting in an interruption of the operation to enter a shift command. For example, even in the case where the driver temporarily stops entry of a shift command while the vehicle is running on a largely curved region, the control system is prevented from returning to the automatic shift mode, and is thus prevented from performing shift control that is not intended by the driver. Also, the time or duration for which automatic shifting of the transmission is inhibited can be set in accordance with the length of time that the shift command is detected or entered, thus assuring improved operability. Also, even in the case where the driver unavoidably release his/her hand(s) off the steering wheel while operating the vehicle, and the operation to enter a shift command is interrupted, the control system is prevented from performing shift control that is not intended by the driver when a shift command is detected again before the system returns to the automatic shift mode.

While the embodiments as described above are concerned with the case where the control system makes a switch to the shift inhibition mode when the shift SW is pressed and held down for a length of time that exceeds the specified time, the invention is not limited to this case, but the condition under which a switch to the shift inhibition mode is started may be changed such that the control system switches to the shift inhibition mode during turning of the vehicle 1, as in the fourth embodiment as explained below.

Next, an automatic transmission control system according to the fourth embodiment of the invention will be described with reference to FIG. 1 and FIG. 8.

The automatic transmission control system according to the fourth embodiment is similar in construction to the automatic transmission control system according to the first embodiment of the invention. The same reference numerals as used in FIG. 1 illustrating the first embodiment will be used for identifying constituent elements of the control system of the fourth embodiment, and only the differences between these embodiments will be described in detail.

The T-ECU 12 is arranged to receive the lateral acceleration of the vehicle 1 which is measured by the acceleration sensor 30.

The T-ECU 12 compares the acceleration received from the acceleration sensor 30 with a threshold value stored in advance in the ROM, and determines that the vehicle 1 is turning if the acceleration exceeds the threshold value. If the acceleration is equal to or smaller than the threshold value, the T-ECU 12 determines that the vehicle 1 is not turning. Thus, the T-ECU 12 has the function of determining whether the vehicle 1 is turning, based on the lateral acceleration of the vehicle 1 measured by the acceleration sensor 30.

When the T-ECU 12 receives a shift command while the vehicle 1 is not turning, the T-ECU 12 does not make a switch to the shift inhibition mode, but continues to operate in the automatic shift mode.

Figure 8:
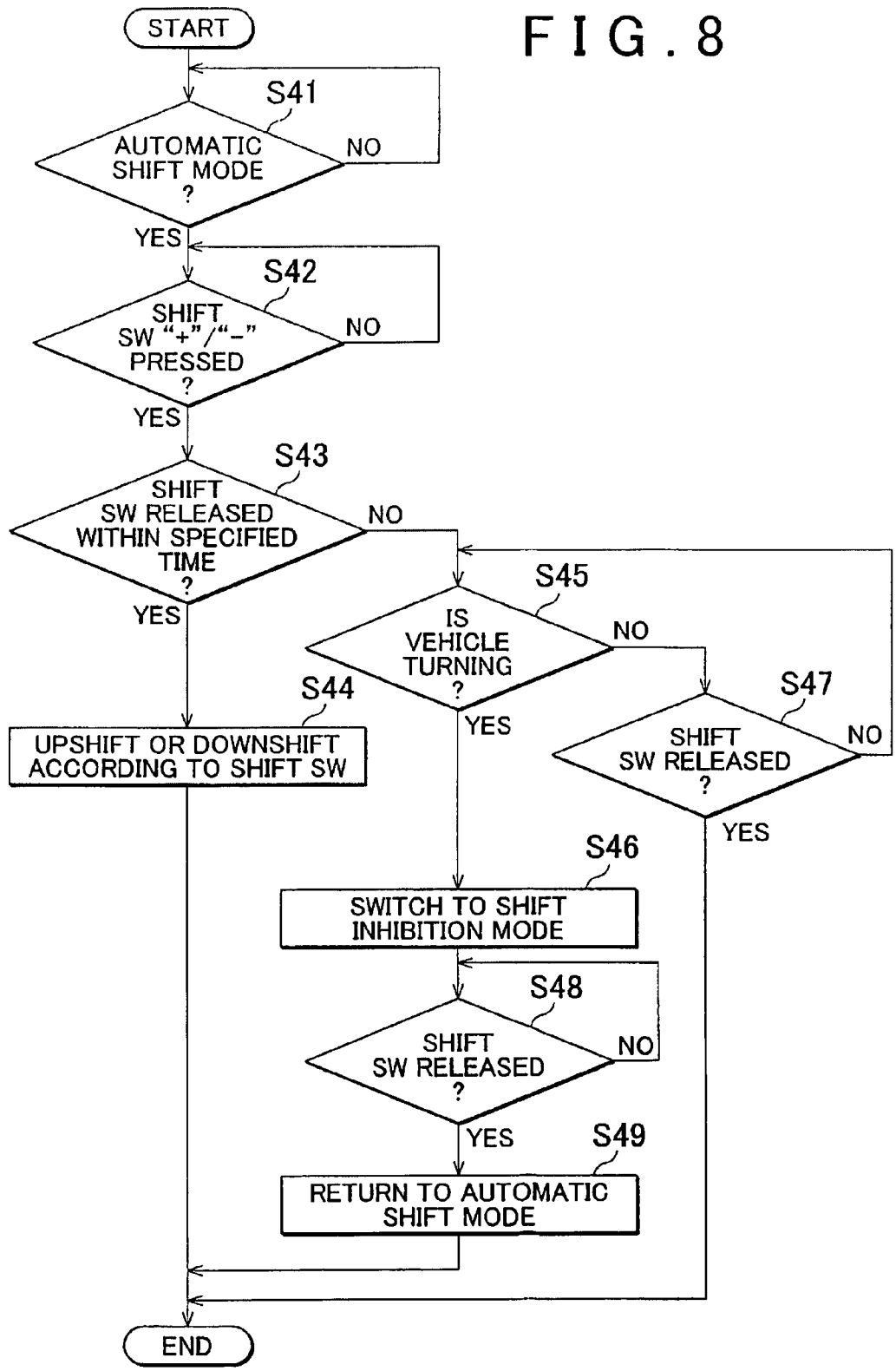
FIG. 8 is a flowchart useful for explaining the operation of an automatic transmission control system according to a fourth embodiment of the invention.

FIG. 8 is a flowchart useful for explaining the operation of the automatic transmission control system according to the fourth embodiment of the invention. The CPU of the T-ECU 12 executes the following control process at given time intervals, according to a program that can be implemented by the CPU.

Initially, the T-ECU 12 determines in step S41 whether it is in the automatic shift mode.

If the T-ECU 12 determines that it is in the automatic shift mode (i.e., if an affirmative decision (YES) is made in step S41), the control proceeds to step S42. If the T-ECU 12 determines that it is not in the automatic shift mode (i.e., if a negative decision (NO) is made in step S41), this step is repeatedly executed.

Then, the T-ECU 12 determines in step S42 whether either of the shift SWs is pressed. When the T-ECU 12 receives a shift command, it determines that one of the shift SWs is pressed (i.e., an affirmative decision (YES) is made in step S42), and starts measuring the length of time that the shift command is entered, using the timer.

If it is determined that neither of the shift SWs is pressed (i.e., if a negative decision (NO) is made in step S42), this step is repeatedly executed.

Then, the T-ECU 12 determines in step S43 whether the shift SW that has been pressed down is released within a specified time stored in advance in the ROM. This determination is made in a manner similar to that of the above-indicated step S13.

If the T-ECU 12 determines that the shift SW that has been pressed down is released within the specified time (i.e., if an affirmative decision (YES) is made in step S43), the T-ECU 12 switches from the automatic shift mode to the manual shift mode, and effects upshift or downshift of the automatic transmission 5 in step S44, according to the upshift command entered from the shift SW "+" 14 or the downshift command entered from the shift SW "−" 15, and finishes the process of FIG. 8.

If the T-ECU 12 determines that the shift SW that has been pressed down is not released within the specified time (i.e., if a negative decision (NO) is made in step S43), on the other hand, the T-ECU 12 determines whether the vehicle is turning in step S45, based on a signal received from the acceleration sensor 30.

If the T-ECU 12 determines that the vehicle 1 is turning (i.e., if an affirmative decision (YES) is made in step S45), the T-ECU 12 makes a switch to the shift inhibition mode in step S46.

If the T-ECU 12 determines that the vehicle 1 is not turning (i.e., if a negative decision (NO) is made in step S45), on the other hand, the T-ECU 12 determines in step S47 whether the shift SW that has been pressed down is released.

If the T-ECU 12 determines that the shift SW that has been pressed down is not released (i.e., if a negative decision (NO) is made in step S47), the control returns to step S45. If the T-ECU 12 determines that the shift SW that has been pressed down is released (i.e., if an affirmative decision (YES) is made in step S47), on the other hand, it finishes the process of FIG. 8.

Where the T-ECU 12 makes a switch to the shift inhibition mode in step S46, the T-ECU 12 determines in step S48 whether the shift SW that has been pressed down is released.

If the T-ECU 12 determines that the shift SW that has been pressed down is not released (i.e., if a negative decision (NO) is made in step S48), this step is repeatedly executed.

If the T-ECU 12 determines that the shift SW that has been pressed down is released (i.e., if an affirmative decision (YES) is made in step S48), it returns from the shift inhibition mode to the automatic shift mode in step S49, and finishes the process of FIG. 8.

In the embodiment as described above, the T-ECU 12 returns to the automatic shift mode immediately after the shift SW is released. However, the T-ECU 12 may return to the automatic shift mode after the shift inhibition mode is extended for a specified period of time after release of the shift SW. In this case, the T-ECU 12 may return to the automatic shift mode after a predetermined time elapses after release of the shift SW. The specified time or duration for which the shift inhibition mode is extended may also be determined in accordance with the length of time that the shift SW is pressed, as in the third embodiment as described above.

In the automatic transmission control system according to the fourth embodiment as described above, the T-ECU 12 determines whether the vehicle 1 is turning, based on the lateral acceleration of the vehicle 1 received from the acceleration sensor 30. However, the vehicle 1 may be equipped with rotational speed sensors that measure the rotational speeds of the right and left wheels of the vehicle 1, respectively, in place of the acceleration sensor 30. In this case, the T-ECU 12 compares a difference between the rotational speeds of the right and left wheels received from the rotational speed sensors, with a threshold value stored in advance in the ROM, and determines that the vehicle 1 is turning when the difference between the rotational speeds of the right and left wheels exceeds the threshold value.

Also, the vehicle 1 on which the automatic transmission control system of the present embodiment is installed may be equipped with a steering angle sensor that measures the steering angle of the steering wheel 13, in place of the acceleration sensor 30, and the T-ECU 12 may determine whether the vehicle 1 is turning, based on the steering angle of the steering wheel 13 received from the steering angle sensor. In this case, the steering angle sensor is mounted on an upper portion of a steering shaft (not shown), and is operable to detect the steering angle $\theta$ of the steering wheel 13 and generate a signal indicative of the steering angle $\theta$. The T-ECU 12 compares the steering angle $\theta$ received from the steering angle sensor with a threshold value stored in advance in the ROM, and determines that the vehicle 1 is turning when the steering angel $\theta$ exceeds the threshold value.

Also, the vehicle 1 on which the automatic transmission control system of the present embodiment is installed may be equipped with any two of the acceleration sensor 30, rotational speed sensors and the steering wheel sensor. In this case, the T-ECU 12 determines that the vehicle 1 is turning when any of the acceleration, the difference between the rotational speeds of the right and left wheels and the steering angle $\theta$ exceeds the corresponding threshold value, or all of these values exceed the respective threshold values.

As described above, the automatic transmission control system according to the fourth embodiment of the invention makes a switch to the shift inhibition mode under the condition that the vehicle is turning. Thus, the system can surely determine the driver's intention from the operation performed by the driver, and can control the automatic transmission in a manner that reflects the intention of the driver. Also, since automatic shifting of the transmission is inhibited only when the vehicle is turning, the inhibition of automatic shifting of the transmission is prevented from being carried out based on a shift command that is erroneously entered by the driver.

In the embodiment as described above, the control system makes a switch to the shift inhibition mode during turning of the vehicle 1, and returns to the automatic shift mode when the shift SW is released. However, the invention is not limited to this, but the condition for returning to the automatic shift mode may be changed such that the control system returns to the automatic shift mode when turning of the vehicle 1 is completed or the shift SW is released, as in the fifth embodiment as described below.

Next, an automatic transmission control system according to the fifth embodiment of the invention will be described with reference to FIG. 1 and FIG. 9.

The automatic transmission control system according to the fifth embodiment is similar in construction to the automatic transmission control system according to the fourth embodiment as described above. The same reference numerals as used in FIG. 1 illustrating the first embodiment will be used for identifying constituent elements of the control system of the fifth embodiment, and only the differences between these embodiments will be described in detail.

When the T-ECU 12 switches from the automatic shift mode to the shift inhibition mode during turning of the vehicle 1, it determines whether the vehicle 1 keeps turning, i.e., turning of the vehicle 1 is continued, based on a signal received from the acceleration sensor 30.

If the T-ECU 12 determines that turning of the vehicle 1 is finished or completed, it returns from the shift inhibition mode to the automatic shift mode irrespective of whether the shift SW "+" 14 or the shift SW "−" 15 is pressed.

Figure 9:
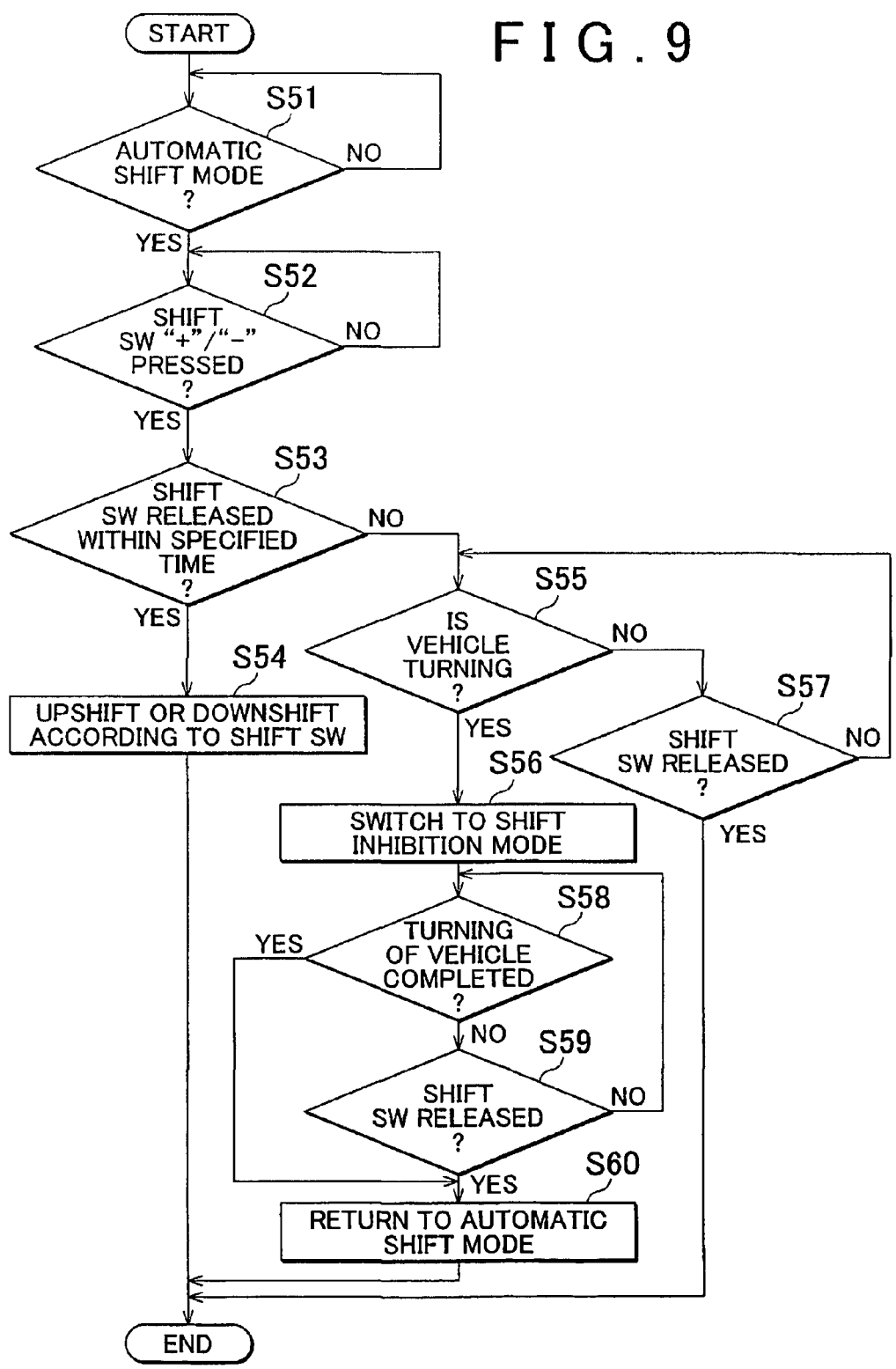
FIG. 9 is a flowchart useful for explaining the operation of an automatic transmission control system according to a fifth embodiment of the invention.

FIG. 9 is a flowchart useful for explaining the operation of the automatic transmission control system according to the fifth embodiment of the invention. The CPU of the T-ECU 12 executes the following control process at given time intervals, according to a program that can be implemented by the CPU.

Initially, the T-ECU 12 determines in step S51 whether it is in the automatic shift mode.

If the T-ECU 12 determines that it is in the automatic shift mode (i.e., if an affirmative decision (YES) is made in step S51), the control poceeds to step S52. If the T-ECU 12 determines that it is not in the automatic shift mode (i.e., if a negative decision (NO) is made in step S51), on the other hand, this step is repeatedly executed.

Then, the T-ECU 12 determines in step S52 whether either of the shift SWs is pressed. If the T-ECU 12 receives a shift command, it determines that the shift SW is pressed (i.e., an affirmative decision (YES) is made in step S52), and starts measuring the length of time that the shift command is entered, by means of the timer.

If it is determined that neither of the shift SWs is pressed (i.e., if a negative decision (NO) is made in step S52), on the other hand, this step is repeatedly executed.

Then, the T-ECU 12 determines in step S53 whether the shift SW "+" 14 or shift SW "−" 15 that has been pressed down is released within a specified time stored in advance in the ROM. This determination is made in a manner similar to that of the above-indicated step S13.

If the T-ECU 12 determines that the shift SW that has been pressed down is released within the specified time (i.e., if an affirmative decision (YES) is made in step S53), the T-ECU 12 switches from the automatic shift mode to the manual shift mode, and effects upshift or downshift of the automatic transmission 5 in step S54, according to an upshift command entered from the shift SW "+" 14 or a downshift command entered from the shift SW "−" 15, and finishes the process of FIG. 9.

If the T-ECU 12 determines that the shift SW that has been pressed down is not released within the specified time (i.e., if a negative decision (NO) is made in step S53), on the other hand, the T-ECU 12 determines in step S55 whether the vehicle 1 is turning, based on a signal received from the acceleration sensor 30.

If the T-ECU 12 determines that the vehicle 1 is turning (i.e., if an affirmative decision (YES) is made in step S55), it makes a switch to the shift inhibition mode in step S56.

If the T-ECU 12 determines that the vehicle 1 is not turning (i.e., if a negative decision (NO) is made in step S55), on the other hand, it determines in step S57 whether the shift SW "+" 14 or the shift SW "−" 15 is released. If the T-ECU 12 determines that the shift SW "+" 14 or the shift SW "−" 15 is not released (i.e., if a negative decision (NO) is made in step S57), the control goes to step S55. If the T-ECU 12 determines that the shift SW "+" 14 or the shift SW "−" 15 is released (i.e., if an affirmative decision (YES) is made in step S57), it finishes the process of FIG. 9.

In the case where the T-ECU 12 switches to the shift inhibition mode in step S56, the T-ECU 12 determines in step S58 whether turning of the vehicle 1 is completed. If the T-ECU 12 determines that turning of the vehicle 1 is completed (i.e., if an affirmative decision (YES) is made in step S58), it returns to the automatic shift mode in step S60, and finishes the process of FIG. 9.

If the T-ECU 12 determines that turning of the vehicle 1 is not completed (i.e., if a negative decision (NO) is made in step S58), it determines in step S59 whether the shift SW "+" 14 or the shift SW "−" 15 is released.

If the T-ECU 12 determines that the shift SW "+" 14 or the shift SW "−" 15 is not released (i.e., a negative decision (NO) is made in step S59), the control goes to step S58.

If the T-ECU 12 determines that the shift SW "+" 14 or the shift SW "−" 15 is released (i.e., an affirmative decision (YES) is made in step S59), on the other hand, the T-ECU 12 returns to the automatic shift mode in step S60, and finishes the process of FIG. 9.

In the embodiment as described above, the T-ECU 12 returns to the automatic shift mode immediately after the shift SW is released or turning of the vehicle 1 is completed. However, the T-ECU 12 may return to the automatic shift mode after the shift inhibition mode is extended for a specified period of time after release of the shift SW or completion of turning of the vehicle 1. In this case, the T-ECU 12 may return to the automatic shift mode after a lapse of a predetermined time for extension of the shift inhibition mode. The specified time or duration for which the shift inhibition mode is extended may also be determined in accordance with the length of time that the shift SW is pressed, as in the third embodiment as described above.

In the embodiment as described above, the T-ECU 12 determines in step S58 whether turning of the vehicle 1 is completed, and determines in step S59 whether the shift SW is released when it is determined that turning of the vehicle 1 is not completed (i.e., the vehicle 1 is still turning, and a negative decision (NO) is made in step S58). However, the T-ECU 12 may omit the operation of step S59, and may repeatedly execute step S58 when it determines that turning of the vehicle 1 is not completed (i.e., the vehicle 1 is still running and a negative decision (NO) is made in step S58).

In the embodiment as described above, the T-ECU 12 determines in step S59 whether the shift SW is released after it determines in step S58 whether turning of the vehicle 1 is completed. However, the T-ECU 12 may determine whether turning of the vehicle 1 is completed after it determines whether the shift SW is released.

As described above, the automatic transmission control system according to the fifth embodiment of the invention is able to cancel the inhibition of automatic shifting at the time when turning of the vehicle is completed. Thus, the control system automatically cancels the inhibition of shifting of the transmission, namely, automatically returns to the automatic shift mode, in the case where the operation to enter a shift command is erroneously continued even after completion of turning of the vehicle. Also, the control system can cancel the inhibition of automatic shifting of the transmission when the driver discontinues entry of a shift command during turning of the vehicle.

In the embodiment as described above, the T-ECU 12 makes a switch to the shift inhibition mode during turning of the vehicle 1, and returns to the automatic shift mode when turning of the vehicle 1 is completed or the shift SW is released. However, the invention is not limited to this, but the conditions for returning to the automatic shift mode may be changed such that the T-ECU 12 returns to the automatic shift mode when turning of the vehicle 1 is completed AND the shift SW is released, as in the sixth embodiment as described below.

Next, an automatic transmission control system according to the sixth embodiment of the invention will be described with reference to FIG. 1 and FIG. 10.

The automatic transmission control system according to the sixth embodiment is similar in construction to the automatic transmission control system according to the fifth embodiment as described above. The same reference numerals as used in FIG. 1 illustrating the first embodiment will be used for identifying constituent elements of the control system of the sixth embodiment, and only the differences between these embodiments will be described in detail.

The T-ECU 12 switches from the automatic shift mode to the shift inhibition mode during turning of the vehicle, and continues the shift inhibition mode even when the entry of a shift command is finished.

The T-ECU 12 returns from the shift inhibition mode to the automatic shift mode when it determines that turning of the vehicle 1 is completed.

Figure 10:
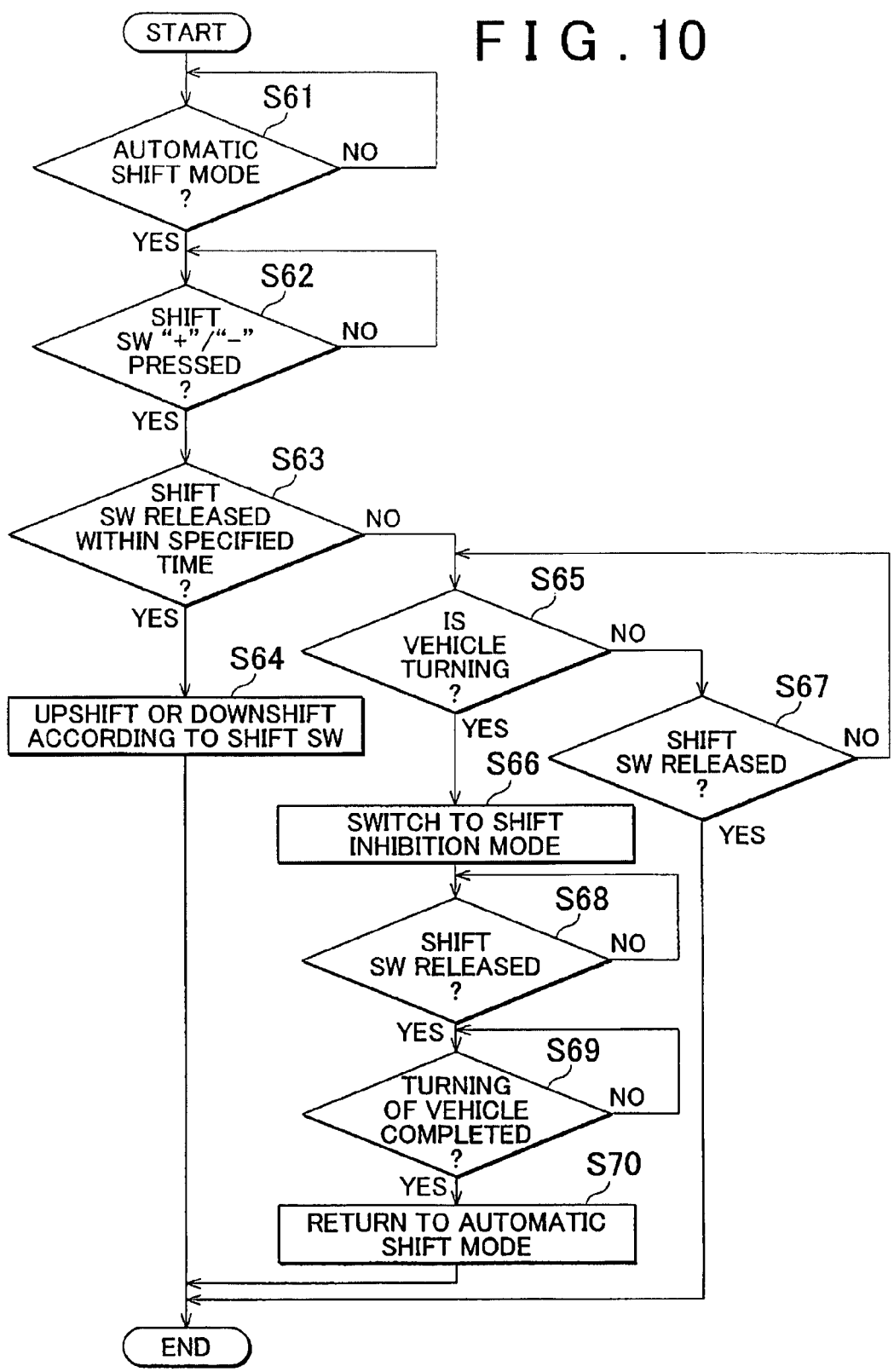
FIG. 10 is a flowchart useful for explaining the operation of an automatic transmission control system according to a sixth embodiment of the invention.

FIG. 10 is a flowchart useful for explaining the operation of the automatic transmission control system according to the sixth embodiment of the invention. The CPU of the T-ECU 12 executes the following control process at given time intervals, according to a program that can be implemented by the CPU.

Initially, the T-ECU 12 determines in step S61 whether it is in the automatic shift mode.

If the T-ECU 12 determines that it is in the automatic shift mode (i.e., if an affirmative decision (YES) is made in step S61), the control proceeds to step S62. If the T-ECU 12 determines that it is not in the automatic shift mode (i.e., if a negative decision (NO) is made in step S61), on the other hand, this step is repeatedly executed.

Then, the T-ECU 12 determines in step S62 whether either of the shift SWs is pressed. If the T-ECU 12 receives a shift command, it determines that one of the shift SWs is pressed (i.e., an affirmative decision (YES) is made in step S62), and starts measuring the length of time that the shift command is entered, by means of the timer.

If the T-ECU 12 determines that neither of the shift SWs is pressed (i.e., if a negative decision (NO) is made in step S62), on the other hand, this step is repeatedly executed.

Then, the T-ECU 12 determines in step S63 whether the shift SW is released within a specified time stored in advance in the ROM. This determination is made in a manner similar to that of the above-described step S13.

If the T-ECU 12 determines that the shift SW that has been pressed down is released within the specified time (i.e., if an affirmative decision (YES) is made in step S63), the T-ECU 12 switches from the automatic shift mode to the manual shift mode, and effects upshift or downshift of the automatic transmission 5 in step S64, according to an upshift command entered from the shift SW "+" 14 or a downshift command entered from the shift SW "−" 15, and finishes the process of FIG. 10.

If the T-ECU 12 determines that the shift SW that has been pressed down is not released within the specified time (i.e., if a negative decision (NO) is made in step S63), on the other hand, the T-ECU 12 determines in step S65 whether the vehicle 1 is turning, based on a signal received from the acceleration sensor 30.

If the T-ECU 12 determines that the vehicle 1 is turning (i.e., if an affirmative decision (YES) is made in step S65), it makes a switch to the shift inhibition mode in step S66.

If the T-ECU 12 determines that the vehicle 1 is not turning (i.e., if a negative decision (NO) is made in step S65), on the other hand, it determines in step S67 whether the shift SW that has been pressed down is released. If the T-ECU 12 determines that the shift SW that has been pressed down is not released (i.e., a negative decision (NO) is made in step S67), the control goes to step S65. If the T-ECU 12 determines that the shift SW that has been pressed down is released (i.e., if an affirmative decision (YES) is made in step S67), on the other hand, it finishes the process of FIG. 10.

In the case where the T-ECU 12 switches to the shift inhibition mode in step S66, the T-ECU 12 determines in step S68 whether the shift SW that has been pressed down is released.

If the T-ECU 12 determines that the shift SW that has been pressed down is not released (i.e., if a negative decision (NO) is made in step S68), this step is repeatedly executed.

If the T-ECU 12 determines that the shift SW that has been pressed down is released (i.e., if an affirmative decision (YES) is made in step S68), on the other hand, the T-ECU 12 determines in step S69 whether turning of the vehicle 1 is completed. If the T-ECU 12 determines that turning of the vehicle 1 is completed (i.e., if an affirmative decision (YES) is made in step S69), it returns to the automatic shift mode in step S70, and finishes the process of FIG. 10.

If the T-ECU 12 determines that turning of the vehicle 1 is not completed (i.e., if a negative decision (NO) is made in step S69), on the other hand, this step is repeatedly executed.

In the embodiment as described above, the T-ECU 12 returns to the automatic shift mode immediately after turning of the vehicle 1 is completed. However, the T-ECU 12 may return to the automatic shift mode after it continues to operate in the shift inhibition mode for a specified period of time after the completion of turning of the vehicle 1. In this case, the T-ECU 12 may return to the automatic shift mode after a predetermined time elapses from completion of turning of the vehicle 1. The specified time or duration for which the shift inhibition mode is extended may also be determined in accordance with the length of time that the shift SW is pressed, as in the third embodiment as described above.

In the embodiment as described above, the T-ECU 12 is arranged to determine in step S69 whether turning of the vehicle 1 is completed after it determines in step S68 whether the shift SW is released. However, the T-ECU 12 may determine whether the shift SW is released after it determines whether turning of the vehicle 1 is completed.

As described above, the automatic transmission control system according to the sixth embodiment of the invention is able to continue inhibition of automatic shifting of the transmission even when the entry of a shift command is finished during turning of the vehicle. Therefore, even if the driver stops entering the shift command so as to concentrate attention on the operation to turn the vehicle 1, the inhibition of automatic shifting of the transmission can be continued, and shifting of the transmission against the driver's intention or request can be prevented. Since the inhibition of shifting of the transmission can be automatically cancelled when turning of the vehicle is completed or when the entry of the shift command is finished after completion of turning of the vehicle, the inhibition of shifting of the transmission can be automatically continued during turning of the vehicle even in the case where the driver stops entering the shift command during turning of the vehicle.

While the shifting mechanism 4 has six gear positions or speeds at the maximum in the illustrated embodiments, the invention is not limited to this, but the shifting mechanism 4 may have five or less gear positions or speeds, or seven or more gear positions or speeds.

While the shifting mechanism 4 of the illustrated embodiments is a stepped shifting type transmission that consists principally of a plurality of planetary gear sets and friction elements for engaging or fixing respective gears of the gear sets, the invention is not limited to this arrangement, but the shifting mechanism 4 may be in the form of a continuously variable transmission of, for example, a belt-and-pulley type. Thus, the present invention is applicable to a control system for any type of automatic transmission whose speed ratio can be changed by a momentary switch or switches (such as paddle switches), to provide substantially the same effects as provided in the illustrated embodiments.

While the automatic transmission 5 has the torque converter 3 and the shifting mechanism 4 in the illustrated embodiments, the invention is not limited to this arrangement, but the automatic transmission 5 may be constructed in the form of an AMT (Automated Manual Transmission). In this case, the automatic transmission 5 is constructed of a shifting mechanism including actuators for disengaging clutches and actuators for selecting shift ranges.

As explained above, when a shift command switch is pressed down for a relatively long time, the automatic transmission control system according to the invention switches from the automatic shift mode to the shift inhibition mode, without switching to the manual shift mode, so as to prevent shift control of the automatic transmission which is not intended by the driver, thus assuring improved driveability. Thus, the invention is useful for automatic transmission control systems capable of performing shift control in the automatic shift mode and the manual shift mode.

While the invention has been described with reference to exemplary embodiments thereof, it is to be understood that the invention is not limited to the described embodiments or constructions. To the contrary, the invention is intended to cover various modifications and equivalent arrangements. In addition, while the various elements of the exemplary embodiments are shown in various combinations and configurations, other combinations and configurations, including more, less or only a single element, are also within the spirit and scope of the invention.

What is claimed is:

1. An automatic transmission control system, comprising:
    a shift control device that controls shifting of an automatic transmission installed on a vehicle, in one of an automatic shift mode in which shifting of the automatic transmission is carried out based on a shift diagram, and a manual shift mode in which shifting of the automatic transmission is manually carried out;
    a shift command detecting device that detects at least one shift command of an upshift command for shifting up the automatic transmission and a downshift command for shifting down the automatic transmission, said shift command being manually entered; and
    a command time measuring device that measures a shift command time for which the shift command is detected by the shift command detecting device, wherein
    when the shift control device controls shifting of the automatic transmission in the automatic shift mode, the shift control device switches from the automatic shift mode to a shift inhibition mode in which shifting of the automatic transmission is inhibited, without switching to the manual shift mode, when the shift command time measured by the command time measuring device exceeds a specified time, and
    when the shift command time is equal to or less than the specified time, the shift control device switches from the automatic shift mode to the manual shift mode.

2. The automatic transmission control system according to claim 1, wherein the specified time is varied based on at least one running condition of the vehicle.

3. The automatic transmission control system according to claim 1, wherein when the shift command ceases to be detected by the shift command detecting device after the shift control device switches to the shift inhibition mode, the shift control device returns from the shift inhibition mode to the automatic shift mode.

4. The automatic transmission control system according to claim 1, wherein the shift command is generated from a momentary switch mounted on a steering wheel.

5. An automatic transmission control method, comprising:
    controlling shifting of an automatic transmission installed on a vehicle, in one of an automatic shift mode in which shifting of the automatic transmission is carried out based on a shift diagram, and a manual shift mode in which shifting of the automatic transmission is manually carried out;
    detecting at least one shift command of an upshift command for shifting up the automatic transmission and a downshift command for shifting down the automatic transmission, said shift command being manually entered;
    measuring a shift command time for which the shift command is detected; and
    when controlling shifting of the automatic transmission in the automatic shift mode, switching from the automatic shift mode to a shift inhibition mode in which shifting of the automatic transmission is inhibited, without switching to the manual shift mode, when the measured shift command time exceeds a specified time, and
    when the shift command time is equal to or less than the specified time, the shift control device switches from the automatic shift mode to the manual shift mode.

6. The automatic transmission control method according to claim 5, further comprising:
    returning from the shift inhibition mode to the automatic shift mode when the shift command ceases to be detected after switching to the shift inhibition mode.

* * * * *